United States Patent Office 3,190,710
Patented June 22, 1965

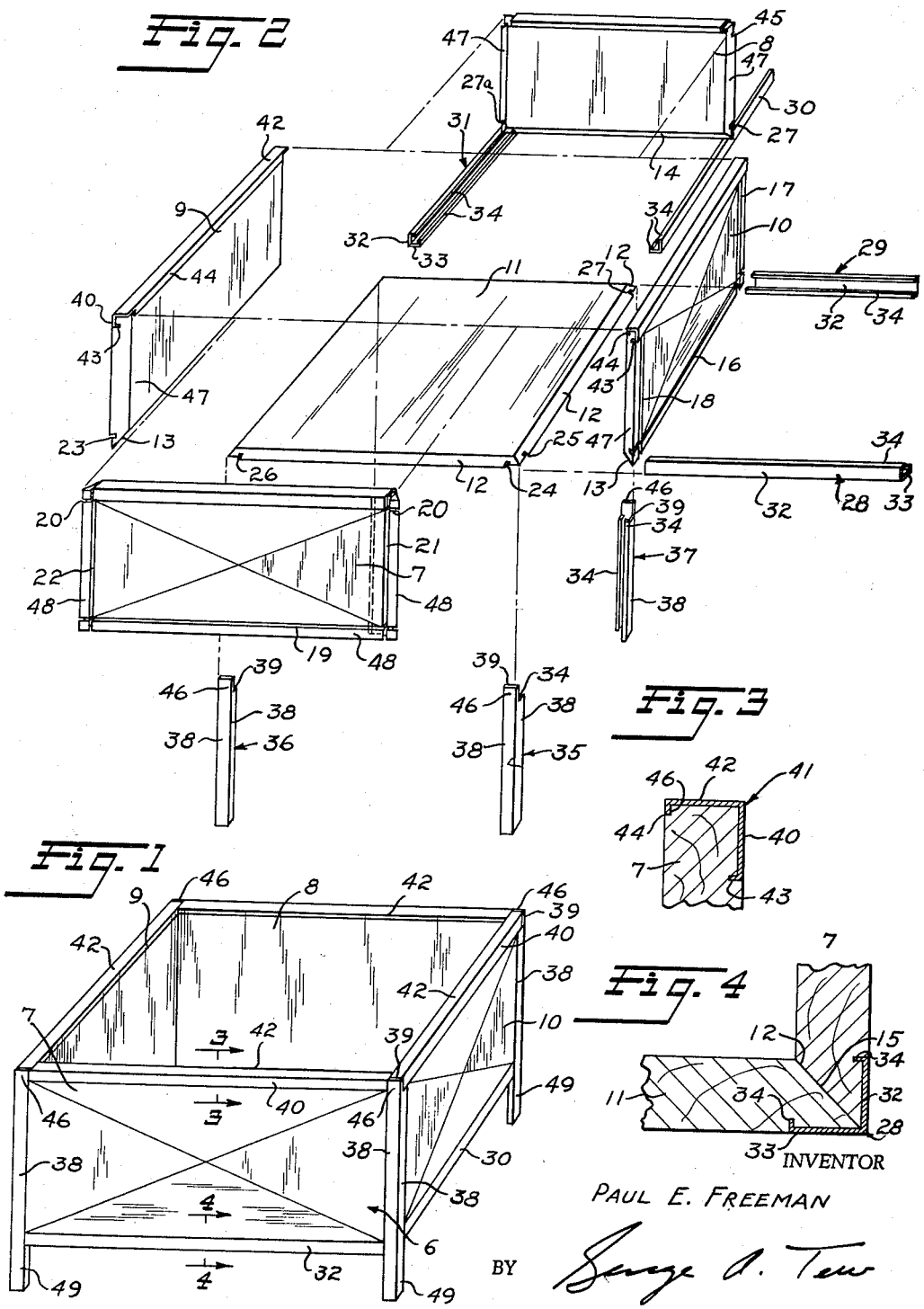

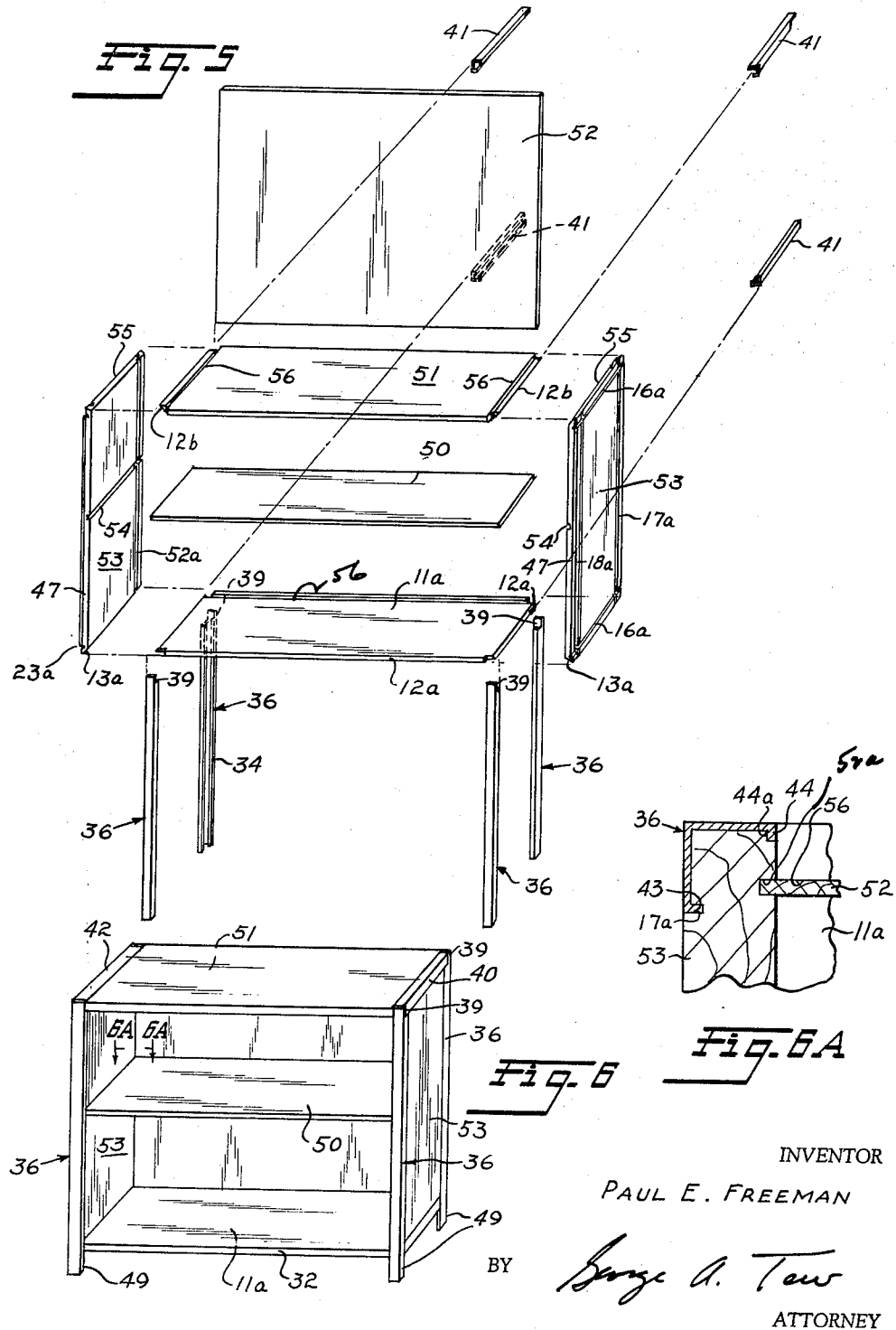

3,190,710
KNOCK-DOWN FURNITURE AND METHOD
OF ASSEMBLY
Paul E. Freeman, Tallahassee, Fla., assignor to Lok Trim Corporation, Tallahassee, Fla., a corporation of Florida
Filed Mar. 8, 1962, Ser. No. 178,289
4 Claims. (Cl. 312—263)

This invention relates to knock-down furniture and is concerned with furniture of various types such as receptacles, so-called planting boxes, book cases, modular store furniture of various types and in fact is intended to be directed to any type of furniture which is capable of ready assembly and disassembly.

An important object of the invention is to provide knock-down type furniture of the type referred to wherein the various elements of the furniture are capable of assembly by means of a plurality of substantially identical extruded angle-shaped or channel metal connectors, the extruded angle-shaped member having longitudinally extending right angle sides, said sides being provided at their inner free ends with inturned flanges which in effect produces a box-like structure. The inturned flange elements of the angle-iron are adapted to cooperate and engage with rabbets or grooves which are rabbeted, as by a dado saw or the like, which grooves are spaced from the respective edges of the elements which are assembled in making up the particular furniture structure desired.

A further important object of the invention is to provide a plurality of somewhat similar channel shaped, box-like extruded fastening elements which are employed to fasten the meeting edges of the various components which are utilized to construct many forms of knock-down furniture. Thus, the extruded elements can all be formed from a single extrusion die, and great saving is obtained in making the fastening elements, which elements can be readily interchangeably used to erect many different structures of furniture.

Further, an important object of the invention is to provide mitered joints between the respective joining portions of the furniture elements, the extruded angle-iron and their flanged portions encompassing the mitered joints along their longitudinal portions.

Another object of the invention is to provide knock-down type furniture which in assembly eliminates the use of any specific fasteners such as nails, screws and the like, which often become lost. Consequently, with the present extruded angle-irons or channels, the various elements of the furniture can be easily assembled in set-up condition, and with little or no chance that the angle-irons will become lost.

Another object of the invention is to provide an angle-iron type of fastening element which thereby permits the ready assembly and disassembly of knock-down furniture of various forms and shapes.

A further object of the invention is to provide a unique leg member which is capable of being attached to various knock-down furniture assemblies, the leg including as one of its elements an extruded angle-iron or channel member substantially identical to the angle-iron used in the assembly of the knock-down furniture.

The invention is illustrated in the accompanying drawings in which:

FIG. 1 is a perspective view of a magazine rack or planter in assembled relation;

FIG. 2 is an exploded view showing the various elements in their particular relation with respect to the planter as disclosed in FIG. 1;

FIG. 3 is a section taken on the line 3—3 of FIG. 1;

FIG. 4 is a section taken on the line 4—4 of FIG. 1;

FIG. 5 is an exploded view of a book case, showing the various components;

FIG. 6 is a perspective view of a book case or the like in assembled condition;

FIG. 6A is a section on the line 6A—6A of FIG. 6.

Referring specifically to the drawings in which like numerals have been used to indicate similar parts throughout the various views, the planter or magazine rack is generally indicated at 6 and comprises front and rear wall members 7 and 8 and side wall members 9 and 10 and a bottom member 11, which elements in assembled relation go to make up a substantially rectangular box-like structure which is capable of supporting various loose articles or it can be used as a planter or in many other environments.

Referring more specifically to the exploded view as seen in FIG. 2, the bottom or base member 11 is provided along its four marginal edges with a mitered cut as indicated at 12, which mitered portions are capable of fitted association and in abutting relation to a similar mitered portion formed along the lower edges of the front, back and sides, such a joint being shown at 13 provided along the lower edge of the side walls 9 and 10, respectively. Likewise, the lower edge of the rear portion or wall 8 is provided with a mitered portion 14 which is capable of fitted association with the mitered portion 12 along the rear of the base or bottom 11. The lower edge of the front member 7 is likewise provided with a mitered portion 15 which engages and is fitted with the mitered portion 12 along the front edge of the base 11. Such construction provides mitered joints between the lower edges of the front, back and side walls and the four edges of the bottom panel.

Still referring specifically to FIG. 2, it will be seen that the various elements of the rack or planter, that is, the bottom 11 and sides 7, 8, 9 and 10 are provided and spaced slightly inward from their respective edges with rabbets 16 as shown spaced inwardly from the lower edge of the side 10 and rabbets 17 and 18 spaced inwardly along the vertical edges of the side of the panel 10. The front panel 7 is provided with longitudinal rabbets 19 and 20 and similar vertical rabbets 21 and 22. The rear wall 8 is likewise provided with such horizontal and vertical rabbets which are not seen. The side 9 is also provided with horizontal and vertical rabbets, one of the horizontal rabbets being indicated at 23. The base piece 11 is provided along its outer face with longitudinal rabbets 24, 25, 26 and 27.

Specifically, with reference to the angle-shaped or channel elements, which are the only means employed to "set-up" many different type knock-down furniture pieces and, of course, which eliminates the use of nails, screws, or other fastening elements the channel-shaped elements embody a pair of right angularly related walls connected along their longer edges, each of the walls terminating in a flange connected to and formed as an integral part of the wall along a line extending in a direction of the length of the channel-shaped member or angle and extending angularly inwardly of the channel member.

The angle or channel members 28, 29, 30 and 31, which are identical in form and are used to connect the lower edges of the front, rear and side walls of the container to the base 11, comprise angularly related walls 32 and 33, each of the said walls terminating in inwardly directed flanges 34 extending along the direction of the length of the channel members. These specific angle or channel members are, as heretofore described, identical in form, and they are used in the assembly of the base and the respective front, rear and side walls of the container. Thus, the base plate 11 and the various elements of the container are moved into assembled position whereby the channel members can be slidably moved, the flanges 34 engaging in the respective rabbets to enclose the meeting edges of the container. In the preassembled condition the mitered edges 12 of the base 11 abut the complementary mitered edges 13—13 of the two sides and the mitered edges 14—14 of the rear and front panels. Likewise, the correspondingly disposed rabbeted grooves 19 and 25 along the lower front edge, the rabbeted grooves 16 and 24 along one side, rabbeted grooves 23 and 26 along a second side and groove 27 and 27a along the rear side are adapted to receive the inturned flanges 34 of the channel members 28, whereby in assembled relation the channels so far described hold the respective elements of the container in partly assembled relation.

The next step in the assembly of the knock-down piece of furniture involves the assembly of the two front and two rear channels being referred to respectively by numerals 35 and 36 for the front pair and by numeral 37 designating only one of the rear pair, only one of the pair being shown, but it being understood that all four channels are identical. These channels 35, 36, and 37 each consist of longitudinally extending sides 38 and provided with inturned flanges 34 identical to the flanges 34 of the channels 28. It will be noted that each of the vertically disposed channels 35, 36 and 37 have one of their side walls cut-away adjacent their top edges as at 39 to thereby provide a cut-out or recess, the lower edge of which abuts and engages the lower side 41 of the channel 4, at the respective upper corners of the assembled piece of furniture, the lower sides 40 being the longitudinal sides of channel members 41, each including an upper side 42 and each of the sides of the upper channels being provided with inturned flanges 43 and 44 which are adapted to slidably engage in the rabbets 45 and 46 provided along the upper edges of the front, rear and side walls of the furniture. Further, the vertical edge engaging channel members 35, 36 and 37, being provided with the recess or cut-out portion 39 produces an upwardly extending tab 46, which when the corner channels are slid to their final position engage the upper outward edges of the top channel 40. The vertical channel members 36, as heretofore pointed out, have longitudinally extending side members, which side members are provided with inturned flanges 34. These inturned flanges, like the flanges 34 of the horizontally disposed channels 28, slide and engage in vertical rabbets as at 17, 18, 21 and 22 along the vertical corners where the mitered edges as seen at 47 being numbered alike in the several views through FIGS. 1 to 4, to provide mitered joints at the vertical intersections of the respective furniture members, similar to the mitered horizontal joints at 15.

In the present described embodiment, the upper edges of the respective elements which are used to complete the knockdown unit, the channel 41 is applied along these edges which gives a finished appearance to the article, the flange 43 fitting within a complementary rabbet, while the flange 44 fits in a rabbet or groove formed along the upper inside edge of the various elements.

It will be appreciated that the surfaces of the respective elements which are engaged and covered by the sides of the channel members have been cut out as by a rotary planing tool or the like to the thickness of the metal of the channel sides whereby the channel sides lie flush with the remainder of the flush surfaces of the furniture elements. Thus, such planning is indicated at 48 on the front panel 7 as seen in FIG. 2.

The vertical channels are capable of various lengths as desired, the lower portions seen at 49 in FIG. 1 providing legs for the article of furniture disclosed.

In FIGS. 5 and 6 is depicted a knock-down piece of furniture embodying a book case as simply another example of the type of furniture which can be assembled and disassembled with the type of connectors used, the channel connectors being identical to those used in the previous form.

In the illustration seen in FIGS. 5 and 6, the book case comprises a bottom shelf 11a, an intermediate shelf 50, a top 51, a back 52 and identical sides 53. Inasmuch as the channel members which were used in the disclosure and construction of the furniture illustrated in FIGS. 1 through 4, are substantially identical to those used in the illustrated furniture of FIGS. 5 and 6, like numerals have been used to designate the respective channels. The base member 11a of the book case is provided along its respective upper opposite sides with mitered surfaces 12a, and likewise the top member 51 is provided along its adjacent sides with mitered surfaces 12b. Each of the sides 53 are provided substantially midway thereof with a rabbet or groove 54, which rabbet or groove is capable of receiving the side edges of the intermediate shelf 50, when the shelf is slidably moved within the groove.

As heretofore pointed out with respect to the piece of furniture disclosed in FIGS. 1 through 4, the book case is constructed in a substantially identical manner as that disclosed with respect to these figures. Thus, in the assembly of the book case, the side members 53 and their lower edge mitered portions 13a are moved to engagement with the mitered surface 12a of the base of bottom panel 11a. Likewise, the beveled edges 55 of the top edges of the side members 53 are brought to and engaged with the beveled edges 12b of the top 51. When the book case is thus in this preassembled condition, the back member 52 is moved into place as by sliding the same vertically in the rabbets 52a in each of the side panels 53. Referring to FIG. 6A, it will be seen that the rear channel members 36 are provided with inturned flanges 43 engaged in the rabbets 17a and likewise inturned flanges 44a engaging in a rabbet 44 provided along the back edge of the side member 53 while the back wall 52 of the book case is positioned in the vertical grooves or rabbets 52a, the lower edge fitting in the rabbet 56. Next, the channel members 40 and 42 are slid into position along the upper front rear edges of the book case in which position the bottom, top, two sides and back are held in preassembled relation. In this condition the book case is substantially preassembled, however, with the further assembly. This includes sliding the shelf 50 inwardly within the grooves 54 whereby the shelf engages the back 52 of the case and provides an additional shelf for the book case. After the above procedure has been followed, the vertical channels 36 are then moved into position as by sliding the same vertically from the bottom as the inturned flanges 34 engage within the complementary grooves 17a and 18a of the respective sides, the channels 36 lying flush with the front faces of the sides 53, the inturned flange 34 engaging a groove formed along the inner edge of the sides 53. It will be seen that in such condition the cut-out portions 39 and channels 36 engage the lower edges of the side 40 of the channels 41 to act as stops and hold the channels in place. The channels 36 are capable of various lengths whereby to provide legs such as 49, but, of course, these can be omitted if desired by simply making the channels 36 shorter.

From the above disclosure it will be readily recognized that a method of uniting various elements of a various and different type furniture has been disclosed. This is made possible by providing a plurality of substantially identical channel members, each being provided with inturned flanges, which flanges are capable of engagement within cooperating rabbets preformed in the associated surfaces of the respective furniture elements. It is, of course, necessary that the vertically disposed channels be provided with notched-out portions to provide tabs, which tabs when the various channel elements and the furniture elements have been united provide a stop or locking feature whereby the respective channel elements can only be removed by first removing the vertical channels provided with the tabs or stops. Further, it is important that the engaging edges of all of the elements that go into making up a plurality of different type furniture be mitered, thus producing a mitered joint between the respective elements, the joint being housed within the channels and in consequence producing a strong and sturdy construction. This is capable without the use of any specific fastening elements such as screws, nails and the like.

While the invention illustrates only two types of furniture that are capable of assembly and disassembly, it will readily be understood from an understanding of the invention that many types of modular furniture are capable of assembly and disassembly with very little effort upon the part of the operator. The extruded channel members further provide ornamentation for the exposed edges of all of the elements which go to make up various type furniture.

It is conceivable that many modifications and variations are capable within the scope of the invention, and it is not intended that the invention be limited to the exact disclosures, but is capable of considerable variation and modification within the scope of the appended claims.

What I claim is:

1. A knock-down article of furniture comprising a plurality of separate elements including two side members, said elements adjacent their horizontal and vertical meeting edges having engaging mitered edges, each of the elements provided with rabbets adjacent their mitered edges, a plurality of substantially identical channel members having angularly inturned flanges, said flanges engaging within the rabbets adjacent each mitered joint, the upper ends of the vertical channel members being notched to provide upwardly extending tabs, said tabs engaging the terminal edges of the horizontal channel members which are disposed along the upper edges of the two side members, the said channel members enclosing the joints and supporting the furniture in its assembled condition.

2. A knock-down article of furniture comprising in combination, a base, front, rear and side panels, the base panel having all of its edges cut on a miter, each of the front, side and rear panels having their horizontal lower and vertical edges likewise cut on a miter, the horizontal mitered edges of the front, side and rear panels interfitting the mitered edges of the base panel, and the adjacent vertical mitered edges of the front, side and rear panels interfitting each other to provide a box-like structure in assembled relation, said bottom panel having formed on its under surface and adjacent each of its four edges rabbeted grooves parallel with the said edges, the horizontal and vertical edges of the said front, rear and side panels likewise having on their outer surfaces and spaced inwardly from their mitered edges rabbeted grooves disposed parallel to said edges, a plurality of substantially identical horizontally disposed channel members enclosing the horizontal mitered edges of the container, said channels having angularly inturned flanges engaging within the respective rabbets of the mitered joints, and a plurality of substantially vertically disposed channel members having angularly inturned flanges engaging within the corresponding rabbets of the vertical edges of the front, sides and rear panels, the upper portions of the vertical channels being notched to form upwardly extending tabs, said tabs engaging the terminal edges of channel members disposed along the upper edges of the two side members, the horizontal and vertical channel members providing means for uniting the article in assembled relation.

3. A knock-down article of furniture comprising in combination, a bottom panel, side panels, top and back panels, the bottom panel having its respective side edges cut on a miter, each of the side and top panels having their shortened side edges cut on a miter, the mitered edges of the side panels interfitting the mitered edges of the respective top and bottom panels, said bottom panel having formed on its under surfaces and adjacent each of its side edges rabbeted grooves parallel with the side edges, the vertical side panels each having horizontal rabbets parallel and adjacent the respective mitered upper and lower edges, the top panel having rabbeted grooves adjacent the respective mitered side edges, a plurality of substantially identical horizontally disposed channel members enclosing the horizontal upper and lower mitered edges of the article, said channels having inturned flanges engaging within the respective rabbets of the mitered joints, said sides having rabbets disposed adjacent their respective vertical side edges, and a plurality of substantially vertically disposed channel members having angularly inturned flanges engaging within the corresponding rabbets of the vertical edges of the respective side members, the upper terminal portions of the vertical channels being notched to provide tab members, said tab members engaging the terminal edges of the channel members disposed along the upper edges of the two side members, the horizontal and vertical channel members providing means for uniting the article in assembled relation.

4. The structure recited in claim 3, said unit including a back panel, the base adjacent its rear edge having a groove to receive the lower edge of the back panel, and the respective side panels having vertical grooves adjacent the rear edges thereof, the opposite vertical edges of the back panel fitting within the grooves.

References Cited by the Examiner

UNITED STATES PATENTS

| 1,798,182 | 3/31 | Vance et al. | 312—263 |
| 1,800,148 | 4/31 | Mahoney et al. | 248—189 |
| 2,527,603 | 10/50 | Wallance | 248—189 |
| 3,065,038 | 11/62 | Pipe | 312—263 |

FOREIGN PATENTS

| 14,744 | 1886 | Great Britain. |
| 292,021 | 6/28 | Great Britain. |
| 407,961 | 3/34 | Great Britain. |

FRANK B. SHERRY, *Primary Examiner.*